No. 670,417. W. CRONK. Patented Mar. 26, 1901.
HAND RAKE.
(Application filed Aug. 30, 1899.)
(No Model.)
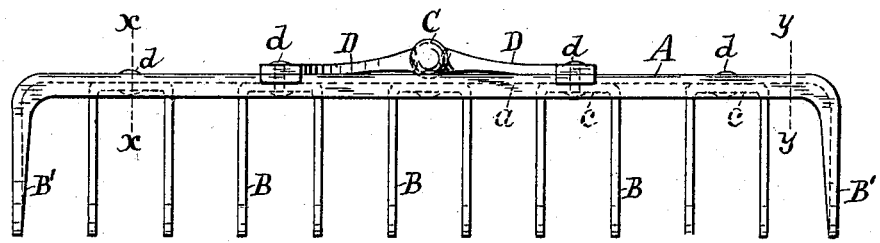
Fig. 1.
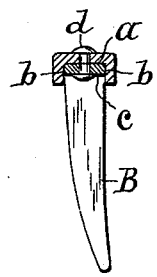 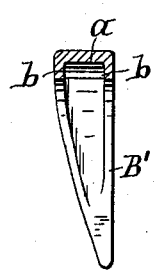
Fig. 2. Fig. 3.
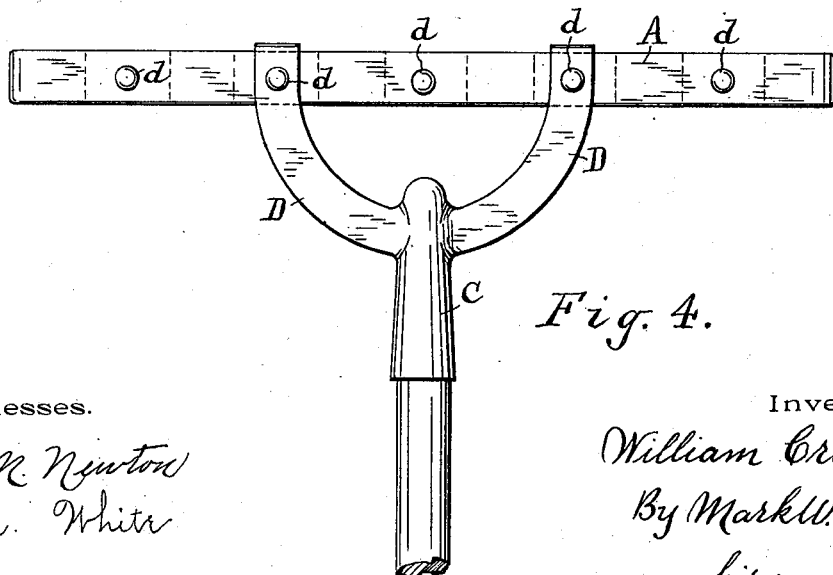
Fig. 4.
Witnesses.
N. M. Newton
L. A. White
Inventor.
William Cronk
By Mark W. Dewey
his Attorney.

UNITED STATES PATENT OFFICE.

WILLIAM CRONK, OF MONTOUR FALLS, NEW YORK, ASSIGNOR TO THE CRONK HANGER CO., OF ELMIRA, NEW YORK.

HAND-RAKE.

SPECIFICATION forming part of Letters Patent No. 670,417, dated March 26, 1901.

Application filed August 30, 1899. Serial No. 728,931. (No model.)

*To all whom it may concern:*

Be it known that I, WILLIAM CRONK, of Montour Falls, in the county of Schuyler, in the State of New York, have invented new and useful Improvements in Hand-Rakes, of which the following, taken in connection with the accompanying drawings, is a full, clear, and exact description.

My invention relates to hand-rakes, and has for its object to provide a rake in a new form of manufacture that will have interchangeable parts, with increased strength and durability.

To this end my invention consists in forming the rake-head of a metal plate with its opposite longitudinal edges bent downward to form a longitudinal groove with vertical parallel side walls and with its opposite ends turned downward to form a pair of teeth, the teeth being bent transversely and inserted in said groove and retained therein by a small bolt or rivet in conjunction with said walls of the rake-head.

In the drawings hereto annexed and forming a part of this specification, Figure 1 is a front longitudinal elevation of the rake. Fig. 2 is a sectional view of the same, taken on line $x\,x$ of Fig. 1. Fig. 3 is a sectional view taken on line $y\,y$ of Fig. 1, and Fig. 4 is a top plan view of the rake.

It will be obvious that the rake-head A may be either a casting of metal with a groove $a$, cast longitudinally in it, opening downward or a metal plate having its opposite longitudinal edges turned downward to form the groove between, with vertically-arranged parallel walls $b$ to make contact with and to retain the teeth B in line when inserted in the groove. The teeth B are cast metal or are cut from sheet metal and bent in ∩-shaped forms, and the transverse part $c$ of each pair of teeth is inserted within the groove of the rake-head. Bolts or rivets $d$ pass through the centers of said transverse portions of the teeth and the upper central part of the head and rigidly secure the teeth therein. It will be apparent that these teeth may be easily removed for the insertion of new teeth, when desired, by removing the bolts or rivets.

My improved hand-rake is in some respects the same as the hand-rake shown and described in my Patent No. 509,999, dated December 5, 1893, but differs from the structure shown in that patent in that the end teeth are not formed of angle-irons removable from the rake-head and riveted to the same, but are formed of the opposite ends of the grooved head. The end teeth of a rake should be heavier and stronger than the other teeth, as they are more liable to injury when the rake is in use, and in order to provide stronger end teeth I taper the ends of the grooved bar to correspond to the shape of the other teeth and bend the ends over sufficiently to provide end teeth B' of suitable length, leaving the upper ends of the teeth the same width as the integral head and the groove extending within the bends down the inner sides of the teeth more or less, as shown in the drawings. This construction provides strong rigid end teeth and a cheaper rake.

The socket C for the handle is integral with a curved or semicircular bar D, having its ends fitted to the top of the head-plate and in position to receive two of the rivets, which pass upward through the teeth and head-plate.

Having described my invention, what I claim as new, and desire to secure by Letters Patent, is—

1. In a rake, the head constructed of a metal plate bent over to form a rectangular hollow head opening longitudinally from its under side, the ends of said head being bent over to form integral end teeth, in combination with transversely-bent teeth inserted in the groove, and secured to the head, substantially as described and shown.

2. In a rake, the head constructed of a narrow metal plate, having its side edges bent downward to form a rectangular groove, the ends of said head being bent over and downward to form integral end teeth, said groove in the head extending within the bends, and down the inner sides of said teeth, in combination with transversely-bent teeth held in the groove of the head by rivets extending through the head and central portion of the teeth, and the handle-socket secured to the head, substantially as described and shown.

In testimony whereof I have hereunto signed my name.

WILLIAM CRONK. [L. S.]

Witnesses:
E. G. CRONK,
W. D. BOWLBY.